United States Patent [19]
Adachi

[11] Patent Number: 5,576,553
[45] Date of Patent: Nov. 19, 1996

[54] TWO DIMENSIONAL THERMAL IMAGE GENERATOR

[76] Inventor: Yoshi Adachi, 16214 Watson Cir., Westminster, Calif. 92683

[21] Appl. No.: 311,189

[22] Filed: Sep. 23, 1994

[51] Int. Cl.$^6$ .................................................. H05B 3/26
[52] U.S. Cl. ................................. 250/495.1; 250/504 R
[58] Field of Search ........................... 250/495.1, 494.1, 250/493.1, 504 R, 316.1, 318; 273/348.1; 219/553; 347/209, 210, 211, 223

[56] References Cited

U.S. PATENT DOCUMENTS

| | | | |
|---|---|---|---|
| 4,620,104 | 10/1986 | Nordal et al. | 250/495.1 |
| 4,724,356 | 2/1988 | Daehler | 250/495.1 |
| 4,769,527 | 9/1988 | Hart et al. | 250/494.1 |
| 4,859,080 | 8/1989 | Titus et al. | 250/495.1 |
| 4,922,116 | 5/1990 | Grinberg et al. | 250/495.1 |

Primary Examiner—Jack I. Berman
Assistant Examiner—Kiet T. Nguyen
Attorney, Agent, or Firm—James T. English

[57] ABSTRACT

An apparatus including an integrated circuit matrix of resistance elements for generating black body thermal images is used as a thermal radiation signal source in infrared apparatus testing and development. The matrix of thermal elements that have quasi-instantaneous temperature rise is controlled by computer program to produce multiple thermal images at locations over the field of view of a detector device or observation camera, and image motion can be simulated by computer program sequences. No transistors are used in the matrix thereby permitting very low cost and fast element heating (e.g., to 350K. in 0.2 μsec from an 80K. cryogenic environment). A system including a cryogenic chamber enables the microcircuit matrix and an infrared CCD observation camera to output video frame and intensity data signals from a simulated cold environment for test of systems such as infrared guidance systems.

1 Claim, 4 Drawing Sheets

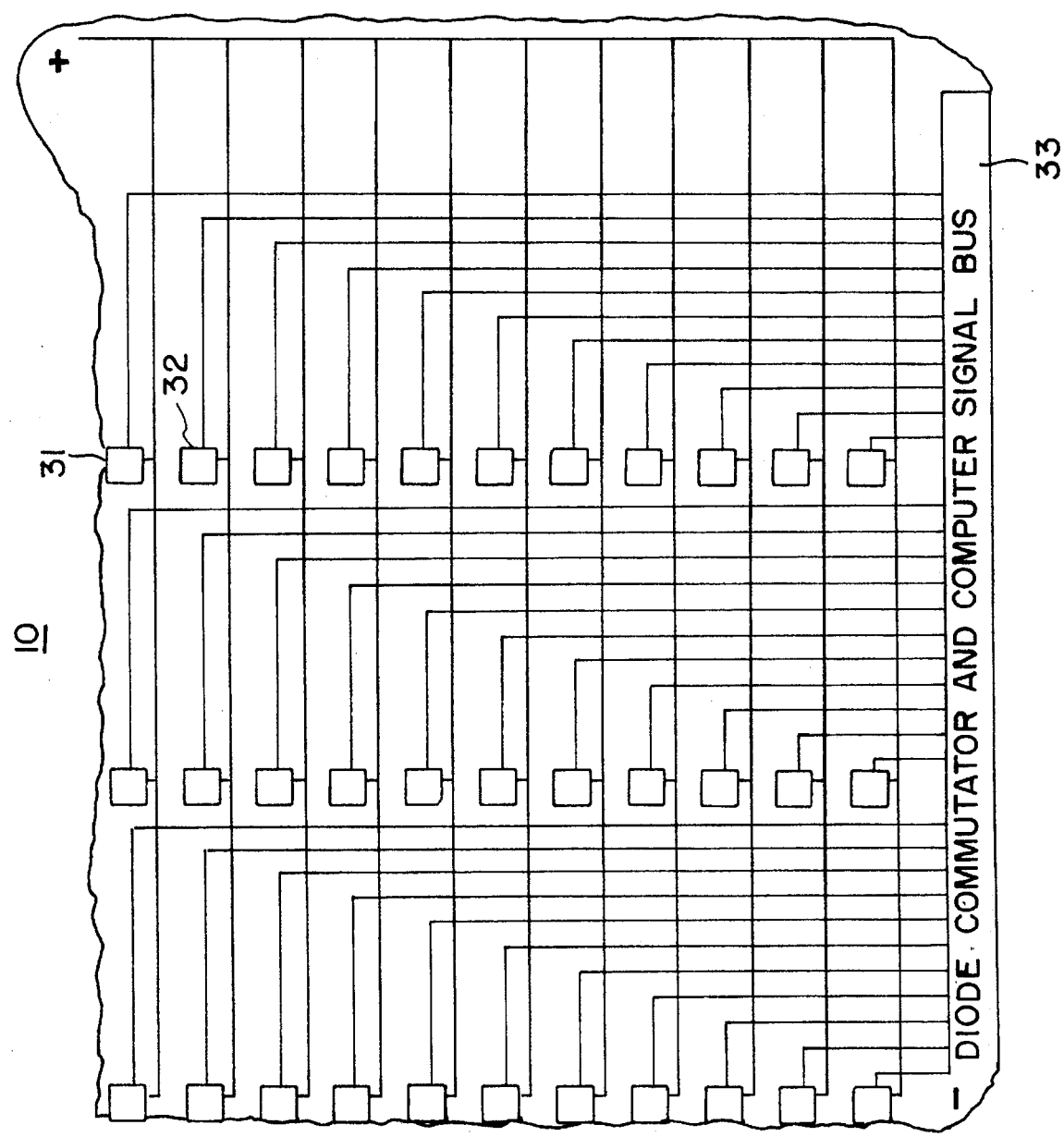

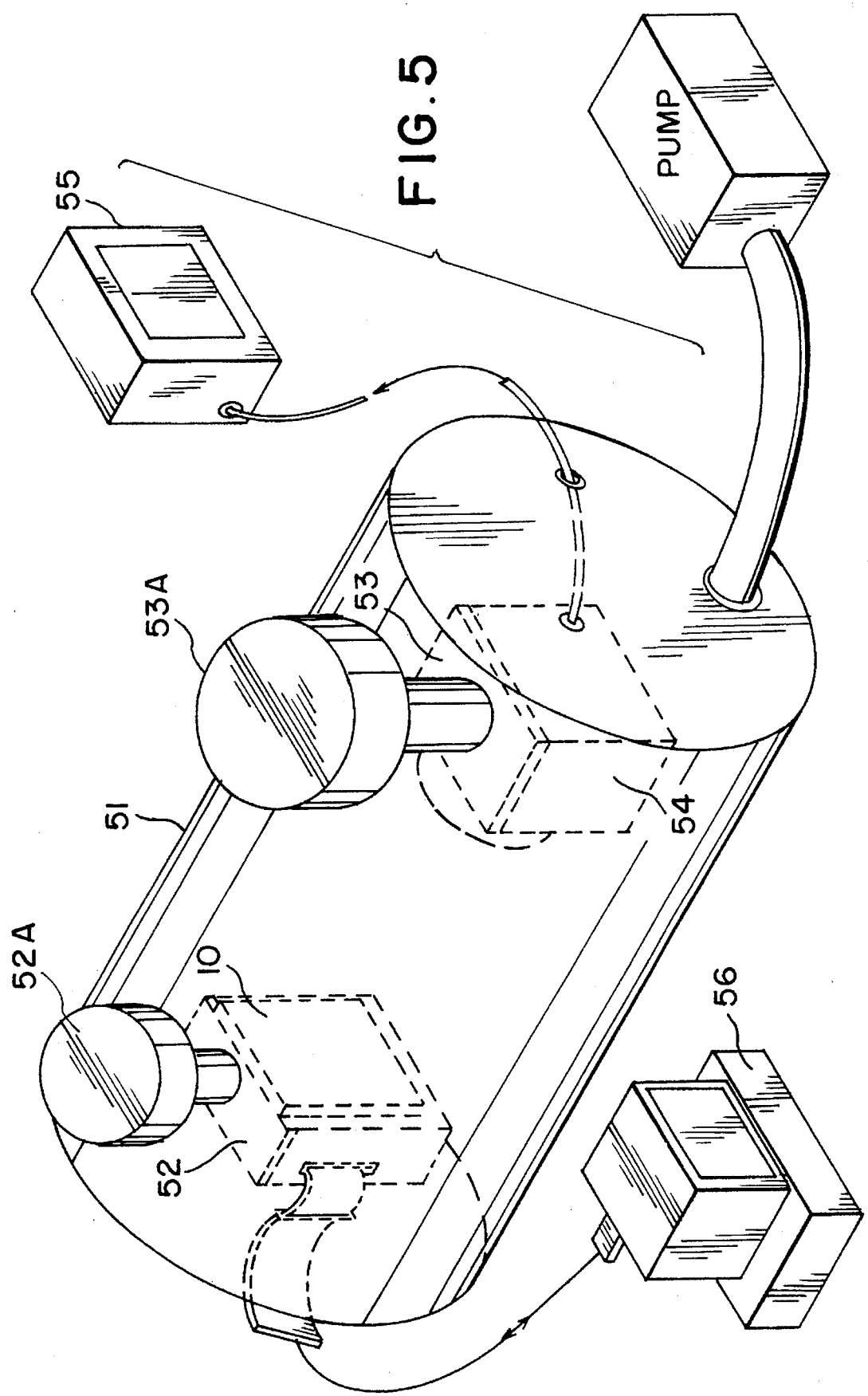

TWO DIMENSIONAL THERMAL IMAGE GENERATOR

BACKGROUND OF THE INVENTION

1. Field of the Invention

The invention relates generally to test instrumentation and more particularly to test simulators for infrared wavelength devices, wherein black body radiators having known thermal radiation intensity are used as a test signal source for infrared imaging and tracking systems test and evaluation. In particular, the invention relates to a thermal imaging means that is relatively inexpensive compared with the prior art by using a novel matrix technical approach to the problem.

An example of a one dimensional thermal source is the popular Fax machine. As a linear thermal source is heated, a thermal paper senses the heat and makes a black spot at the location of the print element; after one scan the paper is moved to the next line and the printed lines are integrated to form a letter or picture.

If this FAX machine-like source would be combined with a scanning mirror and observed by an Infrared camera, a moving object thermal image could be displayed; if a low temperature background is required, the imaging source, mirrors and observation camera must be mounted in a high vacuum tank and cooled to cryogenic temperature. Such a system becomes very expensive. Also, the simple fax machine-like mechanism could not withstand thermal cycling.

There is a need for a relatively inexpensive two-dimensional thermal imaging source capable of operation in a cryogenic environment for generating movable images formed and controlled by computer.

2. Description of the Prior Art

Prior art Black Body radiation sources have been used as thermal standards but were fixed in position. No provision for movement was made. Later, a prior art system was created using scanning mirrors for one degree, or for two degrees of freedom, to create a moving target. However, more than two objects, and independent relative motion cannot be simulated by this system. Also, if a low temperature background source is required, the mirror system, and camera, must be included in a high vacuum tank and cooled to cryogenic temperature. A prior art system of this type using mirrors exists and is very expensive and functionally limited. A black-body matrix using transistors to trigger the thermal elements on and off was used and was prohibitively expensive as well as performance limited.

BRIEF DESCRIPTION OF THE INVENTION

In accordance with the invention, a circuit device to generate moving black body object images consists of a two-dimensional thermal source dot matrix (e.g., 256×256) of resistor elements (100µ square), operable in cryogenic thermal conditions, and is controlled by digital computer for simulating IR images such as a flying missile or aircraft track. The observation and control of the dynamic thermal image is performed using an IR camera, CCD type.

The system including the black-body matrix and the observation camera is mounted in a high vacuum tank and cooled to cryogenic temperatures. All functions are controlled by an external computer. Any desired image or motion over the field of view of the observation camera can be programmed into the computer. Electrical signals from the observation camera provide frame rate and scanning data as well as target image intensity and movement data. These data can be input to an IR guidance system undergoing dynamic testing, for example. The data is also displayed on an external video display screen.

BRIEF DESCRIPTION OF THE DRAWINGS

FIG. 5 is a drawing illustrating the system for infrared image simulation at cryogenic temperature.

DETAILED DESCRIPTION OF THE INVENTION

Figure 1:
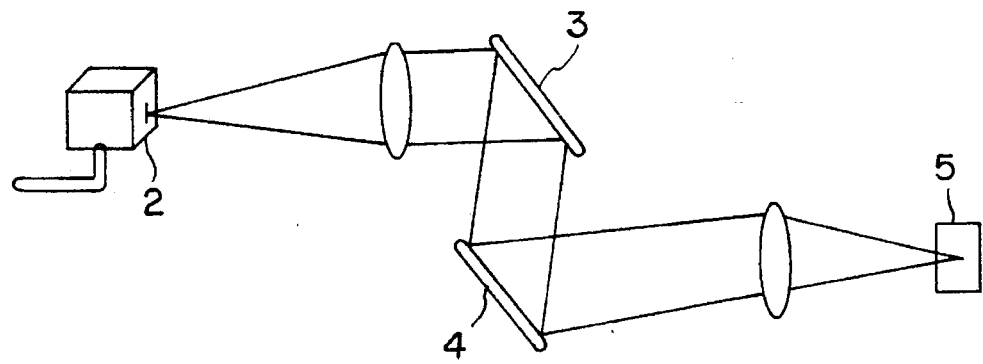
FIG. 1 is a classical setup to observe a moving thermal image in the prior art.

Referring now to FIG. 1, a functional schematic of a setup to observe a moving thermal image in the prior art employs two scanning mirrors 3, 4, that are moved to project the image of the thermal radiative black body source contained in 2 to the detector 5. The motion of the black body image is defined by the scanning mirrors 3, 4 to only one degree of freedom. More than two images, and motion independent of each other cannot take place.

Figure 2:
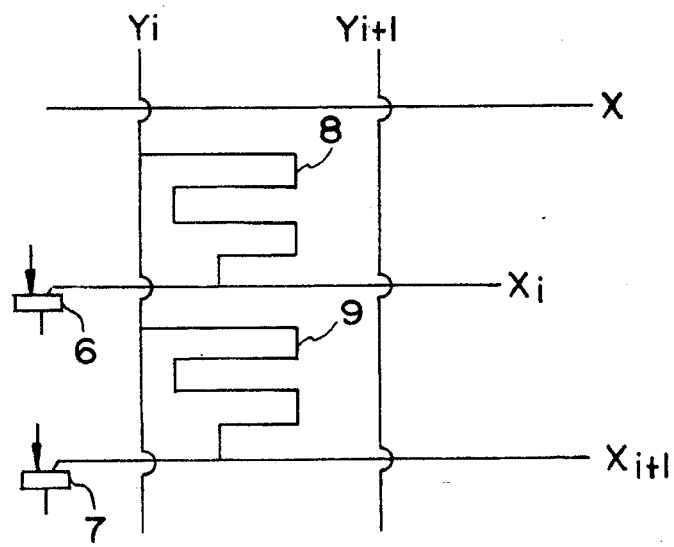
FIG. 2 illustrates a circuit diagam of a two dimensional array in the prior art, which requires a transistor matrix.

A prior art two dimensional thermal source to ignite individual elements needs a transistor to each element, which makes the cost of the source prohibitive. FIG. 2 illustrates a circuit for a two dimensional array in the prior art, which requires a transistor matrix such as is shown by 6, 7, 8, 9.

Figure 3:
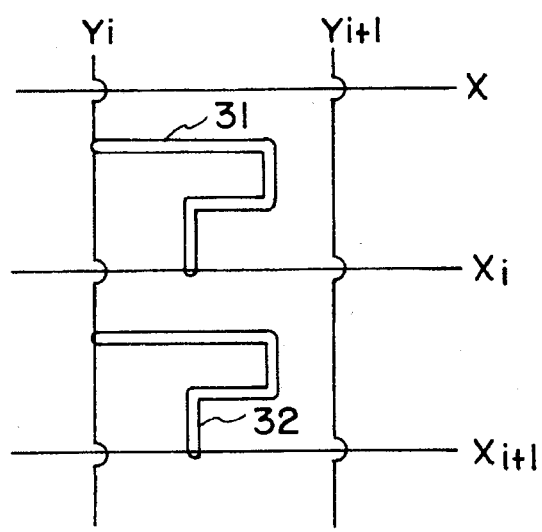
FIG. 3A, shows a circuit diagram of a two dimensional array without transistors.
FIG. 3B an enlarged bottom right portion.

FIG. 3 shows a circuit diagram of a two dimensional array in accordance with the invention, without transistors. When Xi, Yi are energized, element 31 is energized; its neighboring element 32 is heated by radiation from element 31, but the temperature rise is less than 10%. The blackbody radiation peak value moves to a much longer wavelength.

An infrared camera responds to and observes Gaussian intensity distribution; i.e. the same radiation phenomenon as a black body source. Furthermore, the black body matrix unit, made up of elements such as 31, 32, is cooled to a cryogenic temperature such as 80K. The side effect of the radiation coupling to adjacent elements is therefore negligible. A 100×100 micrometer base element, 528×528 thermal element source controlled by computer, see 33 FIG. 3B, is inexpensive.

Figure 4:
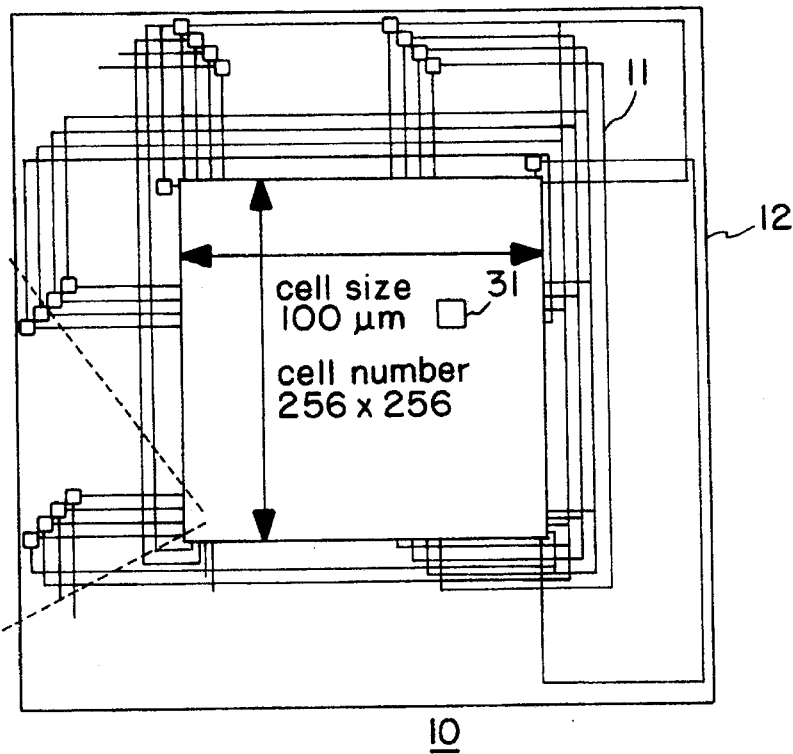
FIG. 4 shows the layout of a prototype array in accordance with the invention, including the Alumina substrate.

FIG. 4 shows a prototype two dimensional array in accordance with the invention. The prototype has the following characteristics:

A 256×256 two dimensional array of 100×100 micrometer black body resistor elements; e.g., 31 FIG. 3A, are mounted in a one square inch area. For a 15 frame per second display, one frame will have a 65 millisecond period.

The unit resistance element should be energized less than 1 microsecond. The resistor thickness=300 Angstroms and resistivity 1.2K Ohms.

Power lines in the Y direction are deposited as shown in FIG. 4. A plurality of 10-micrometer width Gold lines, 11 spaced apart 100 micrometers, are deposited in one direction on an Alumina base 12 which is 2×2 inches. An insulating layer of $SiO_2$ is applied over the power lines 11. Heating elements are deposited using high resistance Silicone material.

The lead lines; e.g. 13, for the 256×256 thermal resistance elements are connected to cable lines that go to a power control computer for programmed activation. Typically the thermal generator is mounted in a cryogenically cooled chamber and connected by cable means to equipment outside of the cryogenic vacuum chamber. A power and signal controlling computer is located outside the vacuum chamber, as shown in FIG. 5.

FIG. 5 is a drawing illustrating the system for infrared image simulation at cryogenic temperature, including the cryogenic chamber 51 and external devices. The matrix resistors, thickness=300 Angstroms and resistivity 1.2K Ohms and total length/width ratio=20/1, are cooled to 80K in the chamber.

Figure 6:
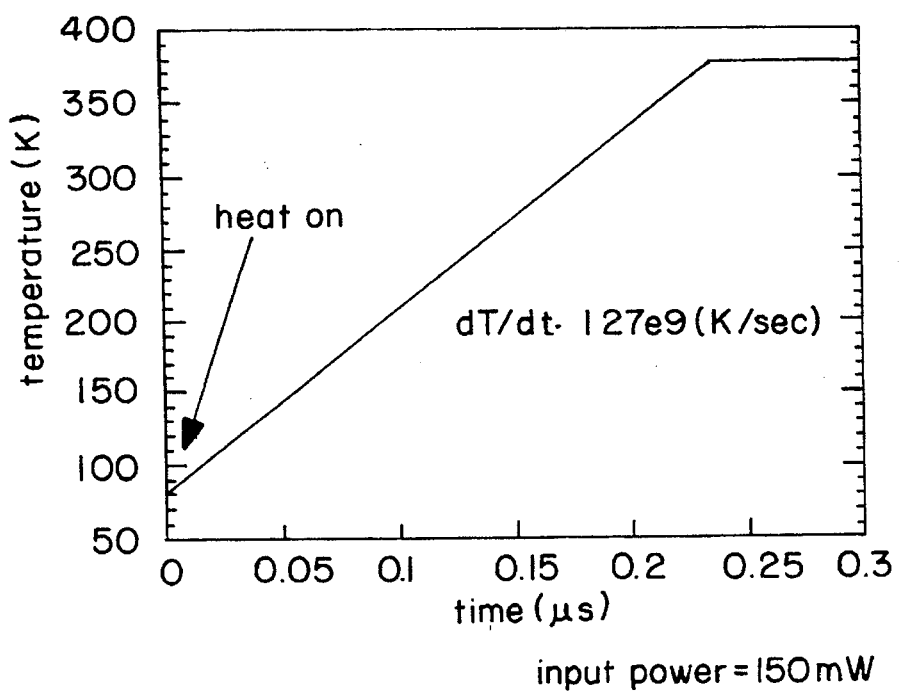
FIG. 6 is a characteristic curve for a resistor of the black body heater matrix showing the linear rise within 0.15 microseconds from 80 to 300 degrees Absolute.

Temperature rise calculated is shown in FIG. 6 which is a characteristic curve for a resistor of the black body heater showing the linear rise within 0.15 microseconds from 80 to 300 degrees Absolute. At applied power 10 ma, 130 mW, the temperature rises to 350K in 0.2 microseconds. This can accommodate a frame rate of 65 msec/frame easily.

A desktop computer using an animation program to simulate motion successively produces a track of images over the full coverage of the field of view of the observing camera. More than two images can be moved independently.

The two dimensional thermal image test system shown in FIG. 5 consists of the Cryogenic cooling chamber 51, including an external vacuum pump, for creating the cryogenically cool environment to 78K, and at least one cooling sink, but preferably two; the first, 52, for the thermal image generator 10 and the second 53, for a test device receptacle 54, which may be a video camera mounting for observing and reading-out the images generated by the image generator 10. Cryogen tanks 52A and 53A, located outside the chamber, abut the sinks 52, 53. A display device 55 connected through a vacuum sealed cable, reads out the response of the observation camera in the cryogenic chamber, showing the thermal pattern in the field of view of the camera. The two dimensional thermal image generator 10 is connected by cable that is vacuum sealed, to an external computer 56 that excites the image generator 10 in accordance with a desired test routine which may include an animated or moving image. The observation camera outputs electrical signals that provide data including frame rate and scanning data as well as image signal position and intensity, providing a continuous video presentation of the image and image track over time, for test of guidance systems or sensors, for example, in or out of the chamber.

Obviously numerous modifications and variations of the present invention are possible in light of the above teachings. It is therefore to be understood that within the scope of the appended claims the invention may be practiced otherwise than as specifically described herein, thereby infringing any patent issuing on this invention as claimed herein.

What is claimed is:

1. A two dimensional thermal image generator system, comprising:

A cooling chamber for creating a cryogenically cold environment to below 75K. including first and second cooling sinks;

A two dimensional thermal image generator integrated circuit mounted in said chamber at said first cooling sink, for generating multi-frame per second display, each frame having a 65 millisecond period, comprising:

An Alumina base 2×2 inches, having power lines in a first orientation, 100 micrometers separation;

Resistor heating elements deposited on the base using high resistance Silicone material, the resistor thickness being 300 Angstroms and resistivity 1.2 K Ohms, total length/width ratio=20/1, and 10 micrometers width connected by Gold lines forming a two dimensional array, one square inch size, 100× 100 micrometer, 256×256 resistor heating elements; and Power switch connector means for energizing any of said resistor heating elements selectively for less than i microsecond including, Computer connector means for connecting the resistor heating elements;

Computer means connected to said computer connector means for directing power to the resistor heater elements in accordance with an animation program, said computer means electrically commutating any one of said resistor heating elements connected to selector grid lines and selectively energizing any of said resistor heating elements for less than 1 microsecond;

Observation means in said chamber including a CCD recording camera having a field of view coincident with said two dimensional thermal image generator integrated circuit, and electrical signals output for frame and intensity, said observation means mounted in said chamber at said second cooling sink; and Readout means external to said cooling chamber receiving thermal output electrical signals from said CCD camera in said chamber, for application as a thermal image generator to provide dynamic thermal image data to a device to be tested;

Whereby heat seeking infrared devices connected to said readout means can be evaluated.

* * * * *